Patented Oct. 26, 1937

2,096,736

UNITED STATES PATENT OFFICE 2,096,736

STABILIZED CHLORINATED SOLVENTS AND METHOD OF STABILIZING SUCH SOLVENTS

Larence F. Dinley, Detroit, Mich., assignor to James H. Bell, Philadelphia, Pa.

No Drawing. Application May 15, 1934, Serial No. 725,732

10 Claims. (Cl. 87—5)

My invention relates to volatile chlorinated solvents and their purification, stabilization, and use. Such solvents are exemplified by trichloromethane, tetrachloromethane, dichlorethane, tetrachlorethane, trichlorethylene, and tetrachlorethylene. An object of the invention is to prevent corrosion or other such action on metals exposed to such solvents,—even when the solvents are heated and vaporized, and are exposed to the air or otherwise in contact with moisture. Such corrosion may arise in the cleaning of metal parts with chlorinated solvents, and in the use of such substances in metallic apparatus,—for cleaning or for other purposes. The use of such solvents as cleaning and degreasing agents has been widely attempted, since they are well known as solvents for oil and other grease. This application is a divisional continuation-in-part of my copending application Serial No. 566,176, filed September 30, 1931.

In the cleaning processes just referred to, metallic or other objects to be cleaned are introduced into a vessel or apparatus containing the heated solvent and its vapor, and constantly or intermittently open (or partly so) to permit the easy introduction and withdrawal of the objects treated. This is possible without excessive loss of solvent vapor because the latter is heavier than air, and because provisions are made to condense the solvent vapor and prevent its escape. Sometimes contact or treatment with the hot liquid solvent is mainly relied on to clean or degrease the object(s) or work; sometimes treatment with the solvent vapor; and sometimes both.

While chlorinated solvents have been found of great value for these and other purposes, their use has been attended with serious drawbacks. Metal articles cleaned with such solvents are subject to objectionable spotting, while metallic apparatus in which the solvents are used is subject to progressive corrosion, that greatly abbreviates its useful life. Also, dangerous fumes are given off, that injuriously affect workers and may even render the vicinity of the apparatus uninhabitable. However, I have discovered ways of obviating such drawbacks.

I have found, in the first place, that these drawbacks are not due to any action of the chlorinated solvents themselves, but to chlorine (present as impurity in the solvent) in available reactive forms, such as hydrochloric acid or other chlorine acids, and free chlorine, even. Commercial chlorinated solvents commonly contain such available chlorine, and may have an acidity that is of measurable magnitude. Moreover, exposure of the (hot) solvent to the atmosphere in the partly open apparatus results in decomposition yielding available chlorine and/or acid, by reaction of the solvent with the atmospheric moisture, and with water that finds its way into the apparatus.

I have further found that in practice such troubles can be overcome by preparing the solvent or carrying out the treatment with it in suitable ways—preferably both. One way of doing this is to carry out the treatment with the solvent in the presence of a reagent that will neutralize or eliminate the available acid and chlorine, such as an alkali or an alkiline metal or compound that is readily chlorinatable,—and preferably water-insoluble or nearly so. Water soluble alkalis have the general drawback that any excess alkali may prove as detrimental as the acid that is to be neutralized. Because of their cheapness, various forms of calcium carbonate are commercially preferable, such as broken or crushed limestone or marble. However, many other substances are known to chemists as having suitable properties, including alkaline earth and other metal oxides and carbonates, such as magnesium oxide or carbonate, cadmium oxide, zinc oxide or carbonate, etc.

While such substances as indicated above perform their above-stated function of neutralizing acid in the liquid solvent, I prefer to carry out the treatment in the presence of an alkaloid, which will stabilize the solvent or counteract the objectionable decomposition,—whether by being itself readily chlorinated, or by neutralizing deleterious products formed (in the vapor) or by preventing the usual decomposition of the solvent (i. e., stabilization in a stricter sense). Whatever its action, the agent employed should, of course, be compatible with the undecomposed solvent, so as neither to react with it under the conditions of use, nor to be driven off or separate from the solvent. That it should not boil so much below the solvent as to be driven off by the heat is also implied in its compatibility with the solvent; and such compatibility likewise implies, of course, that the stabilizer does not decompose under the heat to which the solvent is subjected in use. A great many organic substances such as hereinafter indicated are known to chemists as having suitable properties.

Examples of one class that appear to be effective by neutralizing the (chlorine) acid, as well as by undergoing chlorination are the alkaloids, such as caffeine, quinine, etc. While alkaloids are not volatile like some other types of stabilizers, and do not vaporize freely with the solvent, yet the stabilizing or corrosion-preventing influence of their presence seems to be effective in the solvent vapor, tending to minimize available chlorine in the vapor, besides eliminating it from the liquid solvent.

Insofar as alkaloids are actually chlorinated by chlorine (acid) liberated by incipient decomposition of the solvent, or neutralize such acid, removal of a product of decomposition seems one probable rationale of the stabilizing effect. This applies equally to chlorination of the stabilizer in the strict sense, involving insertion or substitution of chlorine in the stabilizer molecule, or its addition thereto, and to chlorination involving addition of chlorine acid (HCl) to the stabilizer molecule, to form a hydrochloride. In general alkaloids are chlorinated in this latter way: i. e., by forming hydrochlorides. Irrespective of any chlorination, however, it appears that alkaloids have some inhibitory power as against the usual decomposition of the solvent and/or the reaction of the resulting chlorine acid with metal. At any rate, metal treated in their effective presence (mixed with the hot liquid solvent) is protected against corrosion by contact with either the liquid solvent or its vapor,—even when the latter is exposed to the atmosphere. Stabilizing influence of non-vaporizing alkaloid stabilizers felt in the solvent vapor may to a degree be due to a peculiar sort of volatilization of such stabilizers when dissolved in the boiling solvent. In general, alkaloids are soluble in (moist) chlorinated solvents, including trichlorethylene, and impart to the product an alkaline reaction when used in sufficient proportions, such as those hereinafter indicated.

In this application, I aim to cover the alkaloid organic stabilizers, and especially the vegetable alkaloids, exemplified by caffeine and quinine.

As the alkaloids are comparatively expensive, it may be desirable to use the much less expensive solid alkalis like marble or limestone in conjunction with them, to take care of (chlorine) acid or other forms of available chlorine existing or produced in the liquid solvent. For this purpose, several handfuls of broken marble or limestone may be put into the pools of liquid in the apparatus where objects are treated with solvent, and these deposits replenished from time to time, so as to assure an ample supply at all times; and the alkaloid organic stabilizer may be added to the liquid solvent in the apparatus before it has been materially heated,—as soon as the marble or limestone has had a chance to free the solvent of its initial acid or the like. Instead, however, of treating and stabilizing the solvent in the apparatus where objects are treated therewith, it is preferable to do this beforehand.

In general, the proportion of the alkaloid agent added to the solvent may be anywhere from about ¼ of 1% to about 1½% by weight. Such proportions of organic stabilizer suffice to maintain an admixture thereof with the heated chlorinated solvent not merely during one ordinary treatment of work with the solvent, but over an extended period of use of the solvent, involving many such treatments.

Such purified and stabilized chlorinated solvents are useful for many purposes besides the cleaning processes hereinbefore referred to, and will not cause corrosion or give off objectionable fumes as long as any of the stabilizing ingredient remains. In using such prepared solvent in the cleaning processes above indicated, its stability may be prolonged by the presence of marble or limestone in the apparatus, as explained above, and may be extended indefinitely by repeated timely additions of the stabilizing agent.

The boiling points of volatile aliphatic chlorinated solvents hereinbefore mentioned are as follows:

| | °C. |
|---|---|
| Trichloromethane | 61 |
| Tetrachloromethane | 77 |
| Dichlorethane | 84 |
| Trichlorethylene | 87 |
| Tetrachlorethylene | 121 |
| Tetrachlorethane | 146 |

Accordingly, I have limited certain of my claims to aliphatic (or other) chlorinated solvents boiling under substantially 150° C., together with alkaloid stabilizers.

Having thus described my invention, I claim:

1. An improved process of treating greasy objects with hot volatile organic chlorinated grease solvents that decompose when exposed in the hot vapor state to the atmosphere or to moisture, with generation of chlorine acid, and of preventing the decomposition of the solvent, notwithstanding such exposure; which process comprises heating and vaporizing the organic chlorinated solvent that is exposed to the atmosphere or to moisture in the presence of stabilizing vegetable alkaloid that is compatible with the moist chlorinated solvent; and treating the objects with the solvent thus stabilized, while maintaining the admixture of alkaloid with the chlorinated solvent during the exposure of the solvent to the atmosphere or to moisture.

2. An improved process of treating greasy objects with hot volatile organic chlorinated grease solvents that decompose when exposed in the hot vapor state to the atmosphere or to moisture, and of preventing corrosion of metal parts, whether of the apparatus used or the objects being treated, that come in contact with such hot liquid or vaporous solvent, notwithstanding the exposure of the solvent; which process comprises heating and vaporizing the organic chlorinated solvent that is exposed to the atmosphere or to moisture in the presence of stabilizing vegetable alkaloid that is chlorinatable and is compatible with the moist chlorinated solvent; and treating the objects with the solvent thus stabilized, while maintaining the admixture of alkaloid with the chlorinated solvent during the exposure of the metal parts to the solvent and of the solvent to the atmosphere or to moisture.

3. An improved process of treating greasy objects with hot volatile organic chlorinated grease solvents that decompose when exposed in the hot vapor state to the atmosphere or to moisture, and of preventing corrosion of metal parts, whether of the apparatus used or the objects being treated, that come in contact with such hot liquid or vaporous solvent, notwithstanding the exposure of the solvent; which process comprises heating and vaporizing the organic chlorinated solvent that is exposed to the atmosphere or to moisture in the presence of corrosion-preventing vegetable alkaloid that is soluble in and compatible with the moist chlorinated solvent, and imparts an alkaline reaction thereto; and treating the objects with the solvent thus stabilized, while maintaining the admixture of alkaloid with the chlorinated solvent during the exposure of the metal parts to the solvent and of the solvent to the atmosphere or to moisture.

4. An improved process of treating greasy objects with hot volatile organic chlorinated grease solvents that decompose when exposed in the hot vapor state to the atmosphere or to moisture, with generation of chlorine acid, and of preventing the decomposition of the solvent, notwithstanding such exposure; which process comprises heating and vaporizing the organic chlorinated solvent that is exposed to the atmosphere or to moisture in the presence of stabilizing alkaloid of the class consisting of caffeine and quinine, that is soluble in and compatible with the moist chlorinated solvent; and treating the objects with the solvent thus stabilized, while maintaining the admixture of alkaloid with the chlorinated solvent during the exposure of the solvent to the atmosphere or to moisture.

5. An improved process of treating greasy objects with hot volatile organic chlorinated grease solvents that decompose when exposed in the hot vapor state to the atmosphere or to moisture, with generation of chlorine acid, and of preventing the decomposition of the solvent, notwithstanding such exposure; which process comprises heating and vaporizing the organic chlorinated solvent that is exposed to the atmosphere or to moisture in the presence of the alkaloid caffeine as a stabilizer; and treating the work with the solvent thus stabilized, while maintaining the admixture of alkaloid with the chlorinated solvent during the exposure of the solvent to the atmosphere or to moisture.

6. An oil and grease solvent composition, stabilized and adapted for cleaning or grease-solvent use while hot under atmospheric exposure or with moisture, and comprising volatile chlorinated hydrocarbon grease solvent boiling under substantially 150° C., in combination with a compatible stabilizing vegetable alkaloid present in sufficient proportion to impart an alkaline reaction to the composition, and to stabilize the solvent against decomposition when boiled.

7. An oil and grease solvent composition, stabilized and adapted for cleaning or grease-solvent use while hot under atmospheric exposure or with moisture, and comprising volatile chlorinated aliphatic hydrocarbon grease solvent boiling under substantially 150° C., in combination with a fraction of a percent of compatible stabilizing vegetable alkaloid that is soluble in the moist chlorinated solvent, and is sufficient in amount to impart an alkaline reaction to the composition, and to stabilize the solvent against decomposition when boiled.

8. An oil and grease solvent composition, stabilized and adapted for cleaning or grease-solvent use while hot under atmospheric exposure or with moisture, and comprising volatile chlorinated hydrocarbon grease solvent boiling under substantially 150° C., in combination with compatible stabilizing vegetable alkaloid, of the class consisting of caffeine and quinine, present in sufficient proportion to impart an alkaline reaction to the composition, and to stabilize the solvent against decomposition when boiled.

9. An oil and grease solvent composition, stabilized and adapted for cleaning or grease-solvent use while hot under atmospheric exposure or with moisture, and comprising trichlorethylene in combination with a fraction of a percent of compatible stabilizing vegetable alkaloid sufficient to impart an alkaline reaction to the composition, and to stabilize the trichlorethylene against decomposition when boiled.

10. An oil and grease solvent composition, stabilized and adapted for cleaning or grease-solvent use while hot under atmospheric exposure or with moisture, and comprising trichlorethylene in combination with a fraction of a percent of caffeine sufficient to impart an alkaline reaction to the composition, and to stabilize the trichlorethylene against decomposition when boiled.

CLARENCE F. DINLEY.